(12) United States Patent
Stumpp et al.

(10) Patent No.: US 9,945,491 B2
(45) Date of Patent: Apr. 17, 2018

(54) DRIVE UNIT WITH OPTICAL WAVEGUIDE

(71) Applicant: Georg Fischer Rohrleitungssysteme AG, Schaffhausen (CH)

(72) Inventors: Juergen Stumpp, Klettgau (DE); Stefan Buergi, Basadingen (CH)

(73) Assignee: Georg Fischer Rohrleitungssysteme AG (CH)

( * ) Notice: Subject to any disclaimer, the term of this patent is extended or adjusted under 35 U.S.C. 154(b) by 36 days.

(21) Appl. No.: 15/066,622

(22) Filed: Mar. 10, 2016

(65) Prior Publication Data
US 2016/0265684 A1   Sep. 15, 2016

(30) Foreign Application Priority Data

Mar. 11, 2015   (EP) ..................... 15158553

(51) Int. Cl.
| | | |
|---|---|---|
| G08B 5/22 | (2006.01) |
| F16K 31/05 | (2006.01) |
| F16K 31/50 | (2006.01) |
| F16K 37/00 | (2006.01) |
| F16K 7/12 | (2006.01) |
| F16K 31/04 | (2006.01) |

(52) U.S. Cl.
CPC ............. *F16K 31/05* (2013.01); *F16K 7/126* (2013.01); *F16K 31/04* (2013.01); *F16K 31/047* (2013.01); *F16K 31/508* (2013.01); *F16K 37/0008* (2013.01); *F16K 37/0058* (2013.01)

(58) Field of Classification Search
CPC ........ F16K 31/04; F16K 31/047; F16K 31/05; F16K 31/508; F16K 37/0008; F16K 37/0058; F16K 7/126

USPC .................................................... 340/815.45
See application file for complete search history.

(56) References Cited

U.S. PATENT DOCUMENTS

| | | | | |
|---|---|---|---|---|
| 3,768,775 A * | 10/1973 | Archer | .................... | F16K 27/00 251/230 |
| 4,090,589 A * | 5/1978 | Fitzwater | .............. | F16D 13/025 185/40 R |
| 4,705,061 A | 11/1987 | Mueller et al. | | |
| 6,498,551 B1 * | 12/2002 | Ammar | ................. | H01L 23/562 257/728 |
| 2004/0058437 A1 * | 3/2004 | Rodgers | ................. | C12M 23/12 435/297.1 |

(Continued)

FOREIGN PATENT DOCUMENTS

| | | |
|---|---|---|
| DE | 3520502 C2 | 5/1994 |
| DE | 103 22 832 B4 | 7/2006 |
| WO | WO-2008-138374 A1 | 11/2008 |

*Primary Examiner* — Naomi J Small
(74) *Attorney, Agent, or Firm* — Harness, Dickey & Pierce, P.L.C.

(57) ABSTRACT

A device for actuating a valve, comprising a casing, said casing exhibiting a transparent region and said casing preferentially having been formed from an upper part and a lower part, a transmission assembly, an electric motor and a base board for attaching electrical components, wherein LEDs or a multicolor LED and an optical waveguide have been arranged in the casing, preferentially on the base board, the position or another function of the valve being indicated by the LEDs lighting up, and the optical waveguide collimating and focusing the light of the LEDs for the purpose of indicating the position or malfunction.

15 Claims, 2 Drawing Sheets

(56) References Cited

U.S. PATENT DOCUMENTS

| | | | |
|---|---|---|---|
| 2006/0169937 A1* | 8/2006 | Nolte | B05B 1/306 251/129.04 |
| 2010/0033340 A1 | 2/2010 | Bogdanowicz | |
| 2010/0243448 A1* | 9/2010 | Maurer | G01N 21/552 204/450 |
| 2012/0243254 A1* | 9/2012 | Frost | F21K 9/00 362/555 |
| 2014/0096850 A1 | 4/2014 | Filkovski et al. | |
| 2014/0116542 A1* | 5/2014 | Feinauer | F16K 37/0041 137/554 |
| 2014/0193113 A1* | 7/2014 | Akiyama | G02F 1/2257 385/2 |

* cited by examiner

DRIVE UNIT WITH OPTICAL WAVEGUIDE

CROSS-REFERENCE TO RELATED APPLICATION

This application claims the benefit and priority of European Patent Application No. 15158553.6, filed on Mar. 11, 2015. The entire disclosure of the above application is incorporated herein by reference.

BACKGROUND

The invention relates to a device for actuating a valve, comprising a casing, said casing exhibiting a transparent region and said casing preferentially having been formed from an upper part and a lower part, a transmission assembly, an electric motor and a base board for attaching electrical components.

Technical Field

Valves are employed in pipeline systems in order to regulate the flow of fluids. Ball valves, butterfly valves, inclined-seat valves, diaphragm valves etc., for example, are employed for this purpose. Such valves find application, for instance, in the chemical process industry, for the treatment of water, in power stations, for cooling applications or control applications etc. Valves of such a type can be controlled manually, pneumatically or electrically. In automatically controlled plants, electrically driven valves are preferred. The valves can be regulated centrally and are driven by means of an actuating device which exhibits an electric motor which actuates the valve via a transmission.

Discussion

Such electric drive units are known from the state of the art. DE 103 22 832 B4 discloses an electric drive unit for a valve with manual actuation. The position of the valve is apparent by virtue of a transparent cover in the electric drive unit. Through the transparent cover a position indicator can be discerned which, on the basis of the position of the valve, for example open or closed, points in the corresponding direction where the corresponding position has been marked. This means that the position indicator rotates into the corresponding position or, via the transmission, is revolved jointly like the shut-off element of the valve and has then been appropriately aligned with a possible inscription "open" or "closed".

In this case it is disadvantageous that in a poorly illuminated space the position indicator can barely be discerned, and also the position of the valve cannot be discerned from a great distance.

SUMMARY OF THE INVENTION

It is an object of the invention to propose a device for actuating a valve, with which the position of the valve or, to be more exact, a position feedback can be discerned well, even in a dark environment, but also with which no excessive lighting is to be generated by several feedback signals in relatively large plants with several valves. In addition, as little energy as possible is to be needed for this purpose.

The object is achieved by virtue of the fact that LEDs or a multicolour LED and an optical waveguide have been arranged in the casing, preferentially on the base board, a position or another function of the valve being indicated by the LEDs lighting up, and the optical waveguide collimating the light of the LEDs for the purpose of indicating the position or malfunction, and guiding it to the transparent region of the casing.

The device for actuating a valve includes a casing, said casing preferentially being formed from an upper part and a lower part. The casing has preferentially been produced from plastic in an injection-moulding process. Obviously, the casing may also be formed from more than two parts; this is dependent on the complexity of the casing, on the components to be added on and incorporated, and also on the valve to be driven. In addition, the casing exhibits a transparent region. The lower part of the casing exhibits a socket which makes it possible to mount the device according to the invention onto a valve and to couple it therewith. The socket has preferentially been designed in such a manner that it is compatible with any valves, by virtue of which the device according to the invention can be employed universally. The socket has preferentially been arranged on the lower base plate of the transmission assembly.

The device according to the invention exhibits, in addition, a transmission assembly that serves for driving the valve that is driven by means of an electric motor. The transmission assembly preferentially exhibits an upper and a lower base plate, between which the gearwheels for the desired power assistance have been arranged. Alternative designs of such a transmission assembly are obviously conceivable. The base plates have been spaced from one another by means of spacer bolts, in order that the gearwheels can be arranged between them.

It is advantageous if the electric motor has been fastened to the upper base plate of the transmission assembly and the drive shaft protrudes through the upper base plate and by means of a gearwheel arranged thereon meshes with a gearwheel of the transmission assembly.

It has proved to be advantageous that the transmission assembly exhibits an upper base plate and a lower base plate, between which gearwheels have been arranged for transmitting the power of the electric motor to the valve to be driven.

Alternative configurations of the transmission assembly are conceivable.

Preferentially, the upper and lower base plates of the transmission assembly are spaced from one another by spacer bolts.

It has proved to be a possible arrangement of the base board that the base board rests on a carrier plate, preferentially made of plastic. The carrier plate has been arranged on the upper base plate of the transmission assembly; this enables an optimal and exactly fitting arrangement of the base board in the casing.

The device according to the invention exhibits, in addition, a base board on which the requisite electrical components have been arranged. Among other things, LEDs or a multicolour LED has/have been arranged on the base board, which by their emission of light indicate the corresponding position or a function such as, for example, a malfunction of the valve. For example, the valve—whether it be a butterfly valve, ball valve, diaphragm valve or some other valve for flow regulation—is open if a green LED lights up, and, for example, when a red LED lights up it is indicated that the valve is closed. The assignments of colours to the corresponding valve positions and/or functions can, of course, be chosen individually, and also intermediate positions of the valve can be indicated. There is also, for example, the possibility to indicate, by flashing of the LEDs, a malfunction of the valve, such as, for example, the fact that the valve cannot be closed. Obviously, other functions can also be indicated by flashing of the LEDs.

The emission of light of the LEDs is intended to be collimated, focused and thereby made more clearly discernible by means of an optical waveguide which has likewise been arranged in the casing. The optical waveguide has preferentially also been arranged on the base board.

It is advantageous if the optical waveguide only has to be plugged in on the base board and, by virtue of its design, has been centred and positioned around the position-indicator shaft.

An advantageous aspect of the collimation of the light and the focusing of the light by means of the optical waveguide is that it can thereby be discerned better whether the LED or the illuminated optical waveguide is emitting light. Since an LED generally only radiates broadly, the light can only be discerned poorly without an optical waveguide as collimating element. Moreover, the environment is not illuminated excessively by the targeted focusing of the light by means of the optical waveguide, and consequently a possible confusion as a result of the lighting-up of many LEDs or of other luminous indication options in large plants can be avoided.

Since the base board has been arranged in the lower region of the casing or, to be more exact, in the lower part of the casing and preferentially the luminous LEDs have been fastened thereon, the distance to the transparent region in the casing or, to be more exact, in the upper part of the casing is relatively large. The optical waveguide also serves here for bridging the distance of the light and, by virtue of its appropriate design, in this way conducts it closer to the transparent region in the casing.

Through the use of LEDs and optical waveguide, strongly luminous elements that need a lot of energy can be dispensed with.

As a further configuration, a position indicator has been arranged in the casing. Said position indicator serves for indicating the position of the valve. This means that, in a manner analogous to the LEDs, the position indicator also indicates the position of the valve, this indication being effected purely mechanically. The position indicator—on which, for example, an arrow or a mere line has been applied by way of indicating symbol—rotates correspondingly or via the transmission is oriented, so as to correspond to the valve, into the position into which the valve is brought. The position indicator corresponds to a conventional rotary indicator which, by rotating, guides the indicating symbol applied thereon in the direction where the indication specifies the corresponding position of the valve. The position indicator has been arranged at the upper end of the position-indicator shaft, the position-indicator shaft having been connected to the transmission, so that by virtue of the position indicator the position of the valve is transmitted and indicated by means of the position shaft.

By virtue of the transparent region, which preferentially takes the form of inspection glass, the position indicator inside the casing is apparent. The inspection glass takes the form of a separate part and can be fitted in the casing by clipping, screwing, gluing, pressing, or by extrusion-coating in the upper part of the casing directly within the injection-moulding process, in which case the arrangement of the inspection glass in the casing should be chosen so as to correspond to the position of the position indicator and to the optical waveguide in the casing.

It has proved to be advantageous that the optical waveguide can be arranged in the background or, to be more exact, in the rear region of the position indicator. As a result, the position indicator is appropriately lit from behind, so that, for example, in the case of an open valve the position indicator is set to "open" and a green LED lights up, and via the optical waveguide the light can be discerned well in the background of the position indicator.

The optical waveguide has preferentially been produced from Plexiglas or transparent polycarbonate.

The invention is distinguished in that the optical waveguide, which is preferentially produced in an injection-moulding process, can be fashioned so as to correspond to the available space and to the given conditions in the actuating device, by virtue of which the design of the optical waveguide can be individual and can be adapted to requirements.

A preferred configuration of the optical waveguide consists in the optical waveguide exhibiting a straight region and a circular region. The two regions adjoin one another. The straight region serves for bridging the distance between base board and inspection glass. The adjoining circular region serves for optimal illumination of the inspection glass. In addition, the circular region exhibits grooves on the outer ring, which form a structure on the lower side of the outer ring, in order to couple out the light uniformly. The optical waveguide exhibits, in addition, in the circular region an inner ring which serves for centring and positioning the optical waveguide. By means of the inner ring, the optical waveguide is centred around the position-indicator shaft. The inner ring has been arranged concentrically with respect to the outer ring and connected by means of ribs. At the other end of the straight region, position pins have been arranged, by means of which the optical waveguide is positioned on the base board.

BRIEF DESCRIPTION OF THE DRAWINGS

An embodiment of the invention will be described on the basis of the Figures, in which connection the invention is not restricted only to the embodiment.

Shown are.

DETAILED DESCRIPTION OF THE PREFERRED EMBODIMENTS

Example embodiments will now be described more fully with reference to the accompanying drawings.

Figure 1:
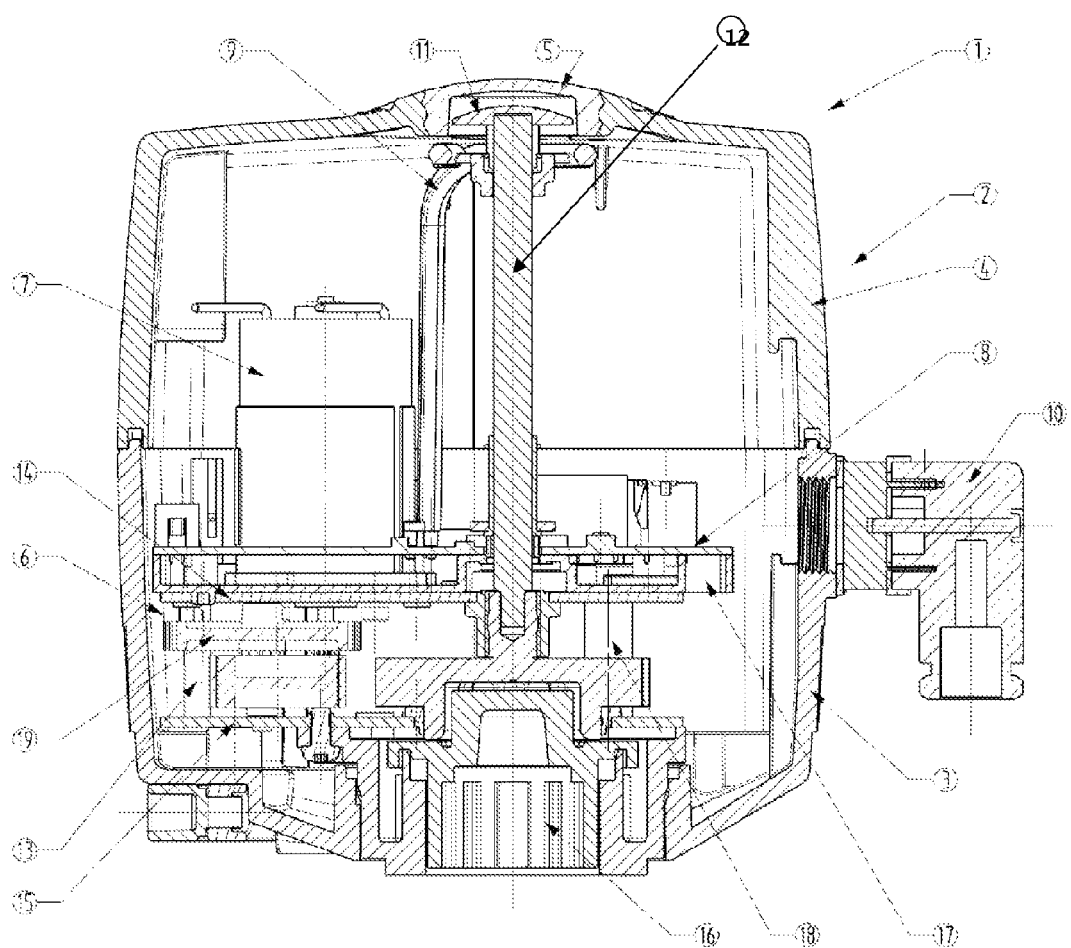
FIG. 1 a longitudinal section through a device according to the invention and FIG. 2 a three-dimensional view of an optical waveguide of the device according to the invention.

Represented in FIG. 1 is a device 1 according to the invention for actuating a valve, said device 1 being able to be employed for a range of valves (not represented). For example, it may be employed for the purpose of actuating ball valves, butterfly valves, diaphragm valves, etc.

The device is preferentially operated electrically, but pneumatic or manual devices would also be conceivable, in which case the supply of electric current would then also be required in each instance, this already being present in the case of an electric device 1 for actuating a valve. The supply of the electric current leads across the terminals 10 provided for this, which can preferentially be screwed directly to the casing 2. The casing 2 of the device 1 according to the invention preferentially consists of an upper part 4 and a lower part 3, though other types of construction of the casing are also conceivable. In the present configuration of the casing 2, in the upper part 4 a transparent region 5 is located which is constituted by an inspection glass 5. By virtue of this inspection glass 5, which has to be fastened to the casing 2 by individual configuration, the position indicator 11 or the position-feedback indication is apparent. This indication reflects the position of the valve. This means that if the valve is open, for example, the indicating symbol on the position indicator 11 has been directed towards the indication "open". The position indicator 11 corresponds to a rotary indicator such as is known from the state of the art. The position indicator 11 has been arranged at the upper end of the position-indicator shaft 12, directly below the inspection glass 5. The other end of the position-indicator shaft 12 has been coupled with the transmission 13 of the transmission assembly 6 and is likewise actuated by means of the transmission 13. The transmission 13 has been arranged in a transmission assembly 6, the individual gearwheels 19 having been arranged between an upper and a lower base plate 14, 15 which have been spaced from one another by means of spacer bolts 18. Other structural forms of the transmission assembly 6 are also conceivable and capable of being incorporated into the casing 2. In order that the device 1 according to the invention can also be adapted to the valves without difficulty, said device exhibits a socket 16 which has been fastened to the lower base plate 15 and protrudes from the casing 2 or, to be more exact, the lower part 3 of the casing.

For the purpose of driving the valve and the transmission 13, an electric motor 7 is employed which has preferentially been fastened to the upper base plate 14, and the gearwheel (not visible) arranged at the end of the drive shaft (not visible) of the electric motor 7 meshes correspondingly with the transmission 13.

The base board 8 has preferentially been arranged in the lower part 3 of the casing 2. By virtue of the fact that the base board 8 has been arranged in the lower part 3, a simple assembly and a good accessibility of the electrical elements arranged thereon and also of the LEDs (not represented) is guaranteed. Of course, the LEDs may also be arranged separately onto a board that is situated closer to the transparent region of the casing. But this, in turn, would be an additional assembly effort and would complicate the structure. In order that the base board 8 has been arranged optimally in the lower part 3 of the casing, it rests on a carrier plate 17 which, in turn, has been arranged on the upper base plate 14 of the transmission assembly 6.

The optical waveguide 9 should preferentially be fixed by being plugged into the base board 8. In this embodiment of the device 1 according to the invention, the optical waveguide 9 is centred on the position-indicator shaft 12 and has been correctly positioned by being plugged into the base board 8 and centred on the position-indicator shaft 12. Since a relatively large distance is present between the base board 8 and the transparent region 5 or inspection glass 5, the LEDs mounted on the base board 8, which serve for indicating the position of the valve, are barely apparent. The LEDs are intended to indicate the position of the valve by lighting up, or serve as position-feedback indication of the valve, and malfunctions can also be indicated. This means that, for example, in the case of an open valve a green LED lights up. In comparison with the purely mechanical position indicator 11, this has the advantage that the position can also be discerned in the dark or in the case of poor lighting. However, such LEDs generally emit light too diffusely in order to discern from a certain distance whether light is being emitted and what is emitting it. The device 1 according to the invention therefore exhibits an optical waveguide 9. The latter collimates and focuses the light of the LEDs, which have been arranged on the base board 8, to the inspection glass 5. For this embodiment of the device 1 according to the invention, the optical waveguide 9 preferentially exhibits a straight region 20 which bridges the distance from the base board 8 to the inspection glass 5. The upper region 21 of the optical waveguide 9 is of circular design, in order to illuminate the complete inspection glass 5 optimally. The inner ring 22 serves for guiding and centring the optical waveguide 9 on the position-indicator shaft 12, as previously described.

Figure 2:
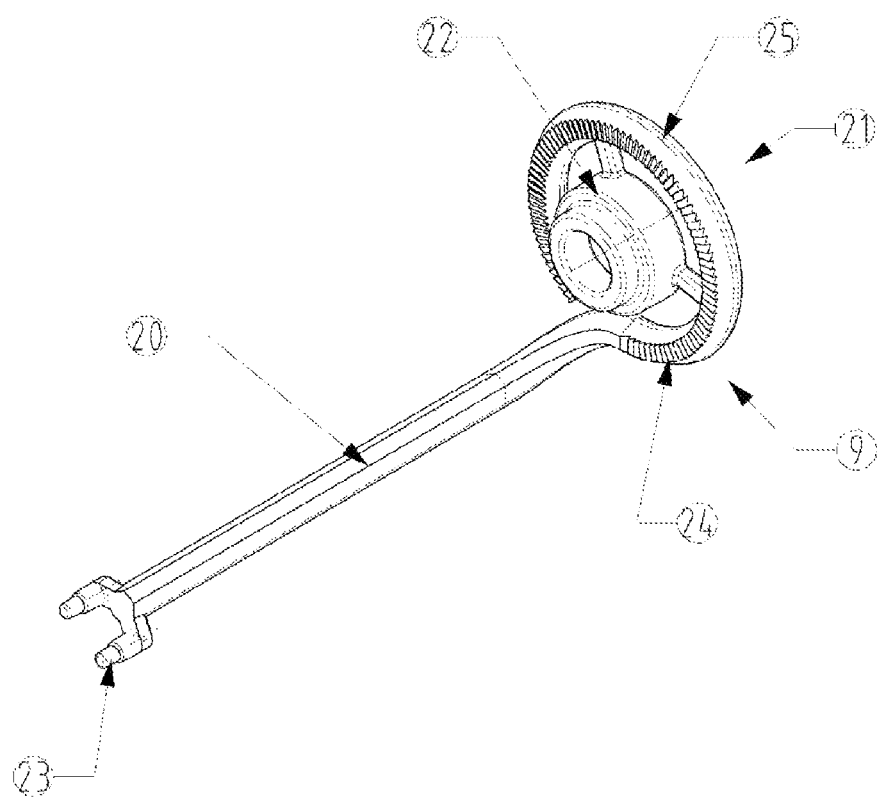

At the lower end of the optical waveguide 9 the position pins 23 have been arranged, in order to fasten the optical waveguide 9 to the base board 8. By virtue of the arrangement of grooves to form a structure 24 in the circular region 21 of the optical waveguide 9, the light is conducted optimally along the circular shape, and the illuminating of the inspection glass 5 is optimized. Through the use of the optical waveguide 9, the luminosity of the LEDs is consequently concentrated and at the same time focused, as a result of which no unnecessary ambient lighting takes place, and the expenditure of energy is also minimal. A preferred configuration of an optical waveguide 9 can be discerned well in FIG. 2.

In the installed state, the circular region of the optical waveguide 9 has preferentially been arranged behind the position indicator 11 and illuminates the latter from behind, i.e., back lights the position indicator 11 to aid its viewing through the inspection glass 5.

By virtue of the fact that the mechanical position indicator 11, the position-indicator shaft 12 and also the optical waveguide 9 have been arranged in the interior of the casing, no further points to be sealed arise on the casing 2. Obviously, the shape of the optical waveguide 9 should be adapted to the casing 2 and to the given conditions. The optical waveguide 9 thus exhibits a straight region 20 extending from the base board 8 to the inspection glass 5 that bridges the electric motor 7.

The invention claimed is:

1. A device for actuating a valve, comprising: a casing, said casing having a transparent region and said casing being formed from an upper part and a lower part, a transmission assembly, an electric motor and a base board for attaching electrical components, wherein an LED and an optical waveguide have been arranged on the base board, a position or malfunction of the valve being indicated by the LED lighting up, and the optical waveguide collimating and focusing the light of the LED onto the transparent region for the purpose of indicating the position or malfunction of the valve, the waveguide having a substantially elongated straight region extending from the base board to the transparent region that bridges the electric motor.

2. The device for actuating a valve, according to claim 1, wherein the transmission assembly includes an upper base plate and a lower base plate, and gearwheels for transmitting the power of the electric motor to the valve to be driven, the gearwheels being arranged between the upper base plate and the lower base plate.

3. The device for actuating a valve, according to claim 1, wherein the upper base plate and the lower base plate have been spaced from one another by spacer bolts.

4. The device for actuating a valve, according to claim 1, wherein the base board rests on a carrier plate, said carrier plate having been arranged on the upper base plate of the transmission assembly.

5. The device for actuating a valve, according to claim 1, wherein a position indicator has been arranged in the casing.

6. The device for actuating a valve, according to claim 1, wherein the transparent region in the casing takes the form of an inspection glass through which the position indicator can be viewed.

7. The device for actuating a valve, according to claim 6, wherein the optical waveguide has an upper portion located below the position indicator to backlight it through the inspection glass.

8. The device for actuating a valve, according to claim 1, wherein multiple LEDs are arranged on the base board.

9. The device for actuating a valve, according to claim 1, wherein the optical waveguide has been formed from Plexiglas or transparent polycarbonate.

10. The device for actuating a valve, according to claim 1, wherein the optical waveguide takes the form of an injection moulding.

11. The device for actuating a valve, according to claim 1, wherein the electric motor has been arranged on the upper base plate of the transmission assembly.

12. The device for actuating a valve, according to claim 1, wherein the straight region of the optical waveguide terminates in a circular region under the position indicator.

13. The device for actuating a valve, according to claim 12, wherein the optical waveguide has an inner ring and an outer ring in the circular region.

14. The device for actuating a valve, according to claim 13, wherein grooves are formed in the outer ring of the circular region.

15. A device for actuating a valve comprising:
a casing having an upper part and a lower part;
an inspection glass in the upper part;
a base board in the lower part having at least one LED thereon;
an electric motor located above the base board,
a transmission assembly coupled to the motor for actuating a valve;
a shaft extending between the inspection glass and the transmission assembly,
the shaft rotating with the transmission assembly when the valve is actuated;
a position indicator rotating with an upper end of the shaft; and
an optical waveguide having a lower portion optically coupled to the LED and a straight portion extending from the lower portion adjacent the shaft to the inspection glass, the waveguide terminating in an inner ring portion and an outer ring portion, the inner ring portion surrounding the shaft and the outer ring portion being located under the position indicator for back lighting the position indicator to aid its viewing through the inspection glass, the optical waveguide collimating and focusing the light of the LED onto the inspection glass for the purpose of indicating a position or malfunction of the valve.

* * * * *